United States Patent [19]

Schieve et al.

[11] Patent Number: 5,463,766
[45] Date of Patent: Oct. 31, 1995

[54] SYSTEM AND METHOD FOR LOADING DIAGNOSTICS ROUTINES FROM DISK

[75] Inventors: Eric Schieve; Richard Finch, both of Austin, Tex.

[73] Assignee: Dell USA, L.P., Austin, Tex.

[21] Appl. No.: 91,498

[22] Filed: Jul. 14, 1993

Related U.S. Application Data

[63] Continuation-in-part of Ser. No. 34,056, Mar. 22, 1993.
[51] Int. Cl.$^6$ ........................................................ G06F 9/06
[52] U.S. Cl. ........................................ 395/650; 395/183.12
[58] Field of Search ............................... 398/700, 578; 371/16.1, 18, 21.1, 27

[56] References Cited

U.S. PATENT DOCUMENTS 5,355,489  10/1994  Bealkowski et al. ................... 395/700

*Primary Examiner*—Vincent P. Canney
*Attorney, Agent, or Firm*—David H. Hit; Michelle M. Turner

[57] ABSTRACT

Disclosed are a system and method for loading diagnostic routines images from disk for execution in a computer system. The method comprises the steps of (1) executing a boot loading routine stored in non-volatile memory within the computer system, the boot loading routine providing an environment in lieu of an operating system of the computer system within which to execute diagnostic routines, the boot loading routine including a disk access routine, (2) retrieving a diagnostic routine stored as an image on a disk into video random access memory ("RAM") with the disk access routine and (3) executing the retrieved diagnostic routine under control of the boot loading routine. The present invention, in its preferred embodiment, allows relatively large diagnostic routines to be stored in the form of images on a disk drive in the computer system and retrieved, as required, into video RAM for execution, without requiring the computer's operating system to function.

44 Claims, 4 Drawing Sheets

SYSTEM AND METHOD FOR LOADING DIAGNOSTICS ROUTINES FROM DISK

CROSS-REFERENCE TO RELATED APPLICATIONS

This application is a continuation-in-part of Ser. No. 08/034,056, that was filed on Mar. 22, 1993, is entitled "USE OF RESET BUTTON TO ENTER EMBEDDED DIAGNOSTICS" and is incorporated herein by reference.

This application is also related to Ser. No. 08/091,548, that was filed on Jul. 14, 1993, is entitled "SYSTEM AND METHOD FOR LOADING COMPRESSED EMBEDDED DIAGNOSTICS" and is incorporated herein by reference.

1. Technical Field of the Invention

The present invention is directed in general to computer diagnostics and, more specifically to diagnostics for personal computers capable of executing when faults prevent the personal computer from booting.

2. Background of the Invention

Today's personal computers (PCs) are many times more powerful than the relatively primitive PCs of the late 1970s and early 1980s. Current technology has produced a PC that essentially has the computing power of a minicomputer; it is a matter of time before PCs reach the power of mainframe computers. In tandem with the growth of the core PC has been a growth in number, complexity and variety of peripheral devices used in conjunction with PCs.

In the early days, a floppy disk drive might have been regarded as exotic, cassette tape players being more common. Today, in addition to floppy drives, PCs are likely to have a Winchester (also called a "hard" or "fixed") drive, a modem, a fax card, a printer, a tape backup unit, a compact disk read only memory "CCD ROM") device, a sound card or, via a small computer systems interface ("SCSI") or music instrument digital interface ("MIDI"), other types of peripherals.

Unfortunately as the number and complexity of peripherals grow, the chances of a fault occurring in the core PC or one of the peripherals escalate. For computer systems in general, it is most helpful for the computer system to provide an indication of the specific location and nature of the fault to help the user to more quickly isolate and more economically repair the fault. To that end, current PCs are typically equipped with some form of internal diagnostics, the purpose of which is detection and subsequent isolation of component faults within the core PC architecture.

Diagnostic routines consist of a series of instructions executed by the central processing unit ("CPU") within the computer system to allow self-diagnosis. For years, computers have been provided with diagnostic routines that test and report on the operational status or functionality of components within the computer, allowing an interested party to repair or replace components that are not functioning to the desired degree. However, prior art embedded diagnostic routines have been limited to testing essential core PC components, such as the microprocessor and the memory subsystem. The above listed peripherals were never the subject of embedded diagnostic testing by software supplied with the core computer. Furthermore, because embedded diagnostics never address peripherals, the peripherals were never testable if the computer was in a "nonbootable" state, a fault in one or more of the peripherals possibly causing such a state.

Diagnostic code is sometimes stored on disk and retrieved therefrom for execution by the CPU (so called traditional disk based diagnostics). One advantage of traditional disk based diagnostics is that disks provide a relatively large area in which to store code, allowing disk-related diagnostic routines to be relatively sophisticated and thorough in their testing and reporting. Unfortunately, diagnostic routines, in general, are frequently invoked when components in the computer are not completely functional. To successfully retrieve and execute disk-based diagnostics, the following components must be fully functional: CPU, address and data buses, bus controller, disk drive controller, disk drive and keyboard. If any significant information is to be relayed back to the user, a display device or a printer and their associated interface hardware must also be fully functional. On a software level, the computer's operating system must also function to retrieve code from the disk. It is apparent therefore that if any one of these components is not fully functional, the diagnostics may not execute or interact with the user properly.

One solution to the above noted problem with disk based diagnostics was solved in part by embedding diagnostic code in solid state, non volatile memory within the computer. Thus, read only memory ("ROM"), for instance, was employed to store diagnostics as firmware. One type of embedded diagnostics is power on self test ("POST") diagnostics, generally stored in basic input output system ("BIOS") ROM in PCs. POST is a series of tests that the computer performs on some of the core components each time the computer is turned on.

As mentioned above, POST, being a prior art diagnostic process, is limited in its scope of testing. POST begins by reading system configuration information that has either been hard wired or stored in non volatile memory. It then checks random access memory ("RAM") by writing to and reading from the RAM to ensure proper operation. POST next examines the disk drives to confirm that they match the system configuration information. Lastly, POST initiates the loading of the operating system, "booting" the computer. Each phase of the POST routine involves a check of the computer system's major components: the CPU, the main and cache memory subsystems, the buses and the hard and floppy disk drives.

In contrast to disk based diagnostics, embedded (or ROM based) diagnostics require the following components to function: CPU, address and data buses, bus controller and keyboard. Again, if any significant information is to be relayed back to the user, a display device or printer and associated interface hardware must also be fully functional. Although ROM based diagnostics are typically required to fit within a smaller space and therefore do not have the luxury of being as thorough as disk based diagnostics, it is apparent that fewer components need be functional to successfully retrieve and execute embedded diagnostics.

Because embedded diagnostic routines are forced to fit within the confines of non volatile memory, those routines must be more compact and thus generally less thorough in their testing than disk based diagnostic routines. To economize on space, embedded diagnostics usually take advantage of BIOS operating system hardware handling routines already stored in ROM, thus eliminating duplication.

Should the user be fortunate enough to have the system up and running at the time when a fault occurs, prior art disk based diagnostics provide an invaluable tool for analyzing computer system faults. However, should a fault render the computer system unable to initialize (or "boot"), there are currently no disk based diagnostic routines capable of executing within a non bootable system to diagnose the fault (a so called "non bootable fault"). This is because today's disk based diagnostic routines operate in conjunction with the computer system's operating system, making calls to its library of hardware-handling routines. And, as previously described, today's disk based diagnostic routines require a large portion of the computer system to function, thus limiting their use when fundamental system faults occur. As mentioned previously, even prior art embedded diagnostics operate in conjunction with BIOS in an effort to reduce space requirements.

Thus, disk based diagnostics are completely inadequate and ineffective unless a large percentage of system components are fully functional, that is rarely the case during a system fault. Disk based diagnostics are therefore not going to have much chance of detecting real world faults, as the vast majority of faults prevent the PC from booting and there are no means of targeting those faults.

Ser. No. 08/091,548 disclosed a system and method for decompressing diagnostic routines from flash ROM to video RAM to allow flash ROM to hold a greater quantity of code than was possible in prior art embedded diagnostics. This allowed greater freedom in performing embedded diagnosis of core components, i.e., detection of non-bootable faults.

There still remains a need in the art for relatively large and detailed diagnostic routines that provide a means for isolating and diagnosing not only non bootable component faults within a computer system, but also integrating into that the testing of peripherals, the diagnostic routines not being dependent upon the computer's normal operating system to function.

SUMMARY OF THE INVENTION

It is therefore a primary object of the present invention to provide thorough and comprehensive diagnostic routines for both the core computer and its peripherals that are stored as a plurality of images on a disk and accessible by the CPU, allowing them to be retrieved one at a time into video RAM, allowing diagnostic routines to be of as large a size as is necessary. The images are executed under the control of an embedded diagnostic operating system that is functional in a pre-boot state and that is completely independent of BIOS or the PC's operating system ("OS").

In the attainment of the above noted primary object, the present invention is the first to provide a method of loading diagnostic routines in a computer system comprising the steps of (1) executing a boot loading routine stored in non-volatile memory within the computer system, the boot loading routine providing an environment in lieu of an operating system of the computer system within which to execute diagnostic routines, the boot loading routine including a disk access routine, (2) retrieving a diagnostic routine stored as an image on a disk into video random access memory (RAM) with the disk access routine and (3) executing the retrieved diagnostic routine under control of the boot loading routine.

It is a further object of the present invention to make sure that the diagnostic routine images to be retrieved from disk have been correctly stored, that data integrity is intact. If the diagnostic routine images are not correctly stored, they will not be able to execute properly when they are retrieved. Accordingly, the present invention further comprises the step of verifying an integrity of information in each diagnostic routine image with the boot loading routine prior to performing the step of retrieving.

Another object of the present invention is to test the integrity of the video subsystem prior to loading retrieved diagnostic routines into video RAM. The reason for this is obvious: if the video subsystem is not functioning, video RAM is not available to store the diagnostic routines and communication with the user via the video subsystem is hampered. Accordingly, the present invention further comprises the step of testing a functioning of the video subsystem of the computer system to determine whether the video subsystem is capable of operating in conjunction with the diagnostics programs prior to performing the step of retrieving.

Yet another object of the present invention is to provide a visual interface to allow the user to select the diagnostic routines the user wants to run. The visual interface is provided by a standard video display device or video monitor coupled to PCs. Prior to using the monitor, however, it becomes necessary to verify that the monitor is present. Accordingly, the present invention further comprises the step of determining a presence of a video monitor of the computer system prior to performing the step of retrieving.

Still another object of the present invention is to retrieve the various stored diagnostic routine images into video RAM as they are needed, loading them as discrete modules. Accordingly, the present invention further comprises the step of retrieving a subsequent diagnostic routine image following execution of the retrieved diagnostic routine. The advantage of this arrangement is that video RAM, the space from which the diagnostic routines are executed, is of limited size. By paging the routines into video RAM one after another, video RAM can be made to hold a program of theoretical infinite size (although one is still limited somewhat by disk size. The disk can be a floppy disk or a hard disk. The hard disk being preferred because hard disks stay with the computer, relieving the user of the job of finding the right floppy disk.

Yet another object of the present invention is to provide a method of performing diagnostics on any type of computer system, whether the computer system is a mainframe, a minicomputer or a PC. However, in the preferred embodiment of the present invention, the computer system is a PC. Users of PCs are far more likely to need computer diagnostics, because more likely than not, they are not as computer literate as those who deal with larger systems. PCs are not typically used in environments wherein technical personnel are continually on hand to diagnose faults.

Still a further object of the present invention is to provide a form of non-volatile memory that allows for periodic changes in the boot loading routine. Accordingly, in the preferred embodiment of the present invention, the non volatile memory is electrically-erasable programmable read only memory ("EEPROM," also termed "flash" memory). Although those skilled in the art should realize that non programmable ROM is suited to contain the boot loading routine, some form of re-programmable ROM allows updating of the boot loading routine as improvements are made therein. Thus, programmable ROM ("PROM") and ultra-violet PROM ("UV PROM") are also within the scope of the present invention. Even RAM that has its own power source to allow it to retain its memory when the computer is powered down (such as complementary metal oxide semiconductor ("CMOS") RAM) is within the scope of the invention.

Finally, the diagnostic method of the present method is adapted to sense which peripherals are actually installed on the computer system. The user is presented with a menu screen listing possible tests to run. The list is a function of peripherals sensed to be present. Obviously, this lends versatility and relative intelligence to the process of diagnosing faults. The present invention is therefore, with the proper routines, able to diagnose faults that exist within floppy drives, Winchester drives, modems, fax cards, printers, tape backup units, CD-ROM devices, sound cards, SCSI ports, MIDI ports and the devices coupled to those ports, in addition to the PC's core components.

In the attainment of the above-noted objects, provisions and advantages, the preferred embodiment of the present invention is a PC comprising (1) a microprocessor, (2) a video subsystem having a monitor and video RAM, the video subsystem allowing the PC to communicate with a user, (3) a disk in a disk drive within the PC, the disk storing a plurality of diagnostic routine images and (4) non volatile memory, the non volatile memory containing a boot loading routine, the boot loading routine providing an elemental operating system to support performance of diagnostics on the PC and containing: (a) a routine for verifying an integrity of information in the plurality of compressed diagnostic routine images, (b) a routine for testing a functioning of the video subsystem to determine whether the video subsystem is capable of communicating with the user, (c) a routine for retrieving a selected one of the diagnostic routine images, (d) a routine for storing the retrieved diagnostic routine in the video RAM within the video subsystem and (e) a routine for executing the retrieved diagnostic routine, the retrieving routine retrieving a subsequent selected diagnostic routine following execution of the retrieved diagnostic routine. The non volatile memory is electrically erasable programmable read only memory ("EEPROM").

In the preferred embodiment, the PC further comprises a keyboard allowing a user to interact with the decompressed diagnostic routine. Thus, the user can direct execution of selected ones of the diagnostic routines as required.

As disclosed in Ser. No. (08/034,056), the diagnostic routines of the present invention are invoked via hardware, allowing the diagnostics to remain software independent and minimally hardware dependent. Accordingly, in the preferred embodiment, the boot loading routine is invoked by pressing a reset button on the PC twice within a predetermined period of time.

The foregoing has outlined rather broadly the features and technical advantages of the present invention so that the detailed description of the invention that follows may be better understood. Additional features and advantages of the invention will be described hereinafter that form the subject of the claims of the invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
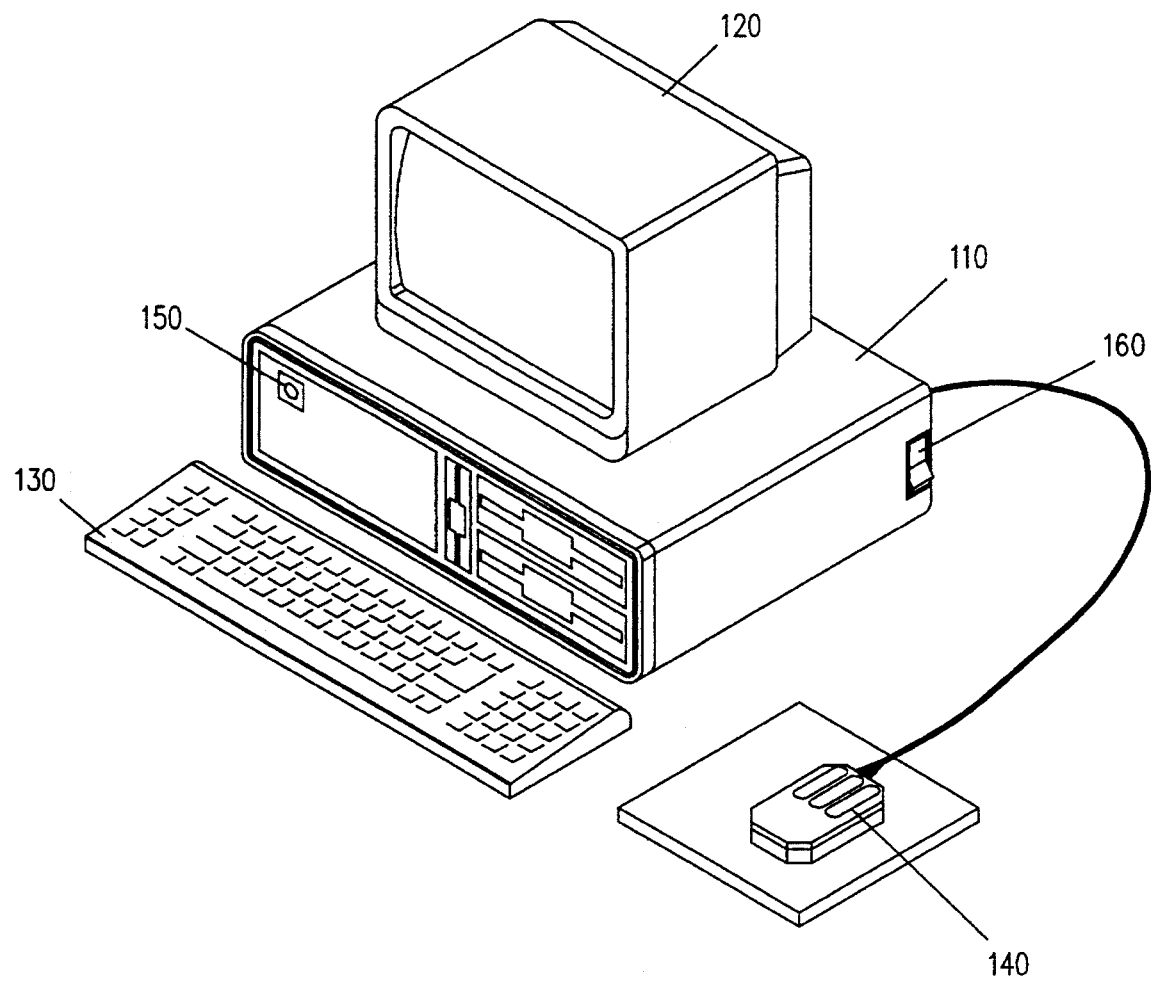
FIG. 1 illustrates an isometric view of a PC providing an environment within which the present invention operates.

FIG. 1 illustrates an isometric view of a personal computer ("PC") embodying the present invention providing an environment within which the present invention operates. The PC comprises a main chassis 110, a video display or monitor 120, a keyboard 130, a pointing device or "mouse" 140 residing on a mouse pad (not referenced) and a floppy disk drive 150. The main chassis 110 contains the PC's microprocessor, its memory and video subsystems and all other computing circuitry, for that matter. These are not shown in FIG. 1, because they are internal to the main chassis 110. The main chassis 110 is also shown as having a reset switch 150 and an on/off power switch 160.

The reset switch 150 traditionally causes the PC to reboot, invoking conventional BIOS POST diagnostics and reinitializing the PC's operating system. However, as has been previously pointed out, the reset switch 150 invokes the boot loading routine and the diagnostic routines of the present invention. Those skilled in the art should realize that a dedicated diagnostics switch can perform the same function; the manner in which the diagnostics are entered is not pertinent to the present invention.

The present invention is the first to store diagnostic routine images on disk without using the PC's BIOS and normal operating system to access the disk. In the present invention, the boot loading routine provides an elemental operating system suitable for reading the images from either a floppy disk or a hard disk. Thus, while the elemental operating system must be able to read a directory and a file allocation table, it need not provide all the capabilities or incur all of the overhead of a standard operating system, such as DOS, in the case of IBM compatible PCs. The directory and file allocation table can therefore be of proprietary format, limited in their size and complexity.

An "image" is defined as a segregable unit of diagnostic code stored on a disk in a form that is retrievable by the elemental operating system provided by the loading routine. Although an image may be physically located in noncontiguous areas of the disk, it is nevertheless labeled as a single image.

The present invention is designed to load the images retrieved from disk into video RAM, that already exists in PCs as part of the video subsystem, allowing a microprocessor within the PC to communicate with a video display, or monitor, coupled to the PC. Video RAM is used because, although the diagnostic routines could be stored in system RAM, that system RAM is often the subject of the diagnostic routines. It is disadvantageous to store diagnostic routines in the same space that is being tested. In particular, the present invention makes use of "integrated" video RAM, or RAM that has been made an integral part of the memory subsystem of the PC in a manner to be explained later, allowing assumptions to be made about the characteristics and quantity of the video RAM.

Figure 2:
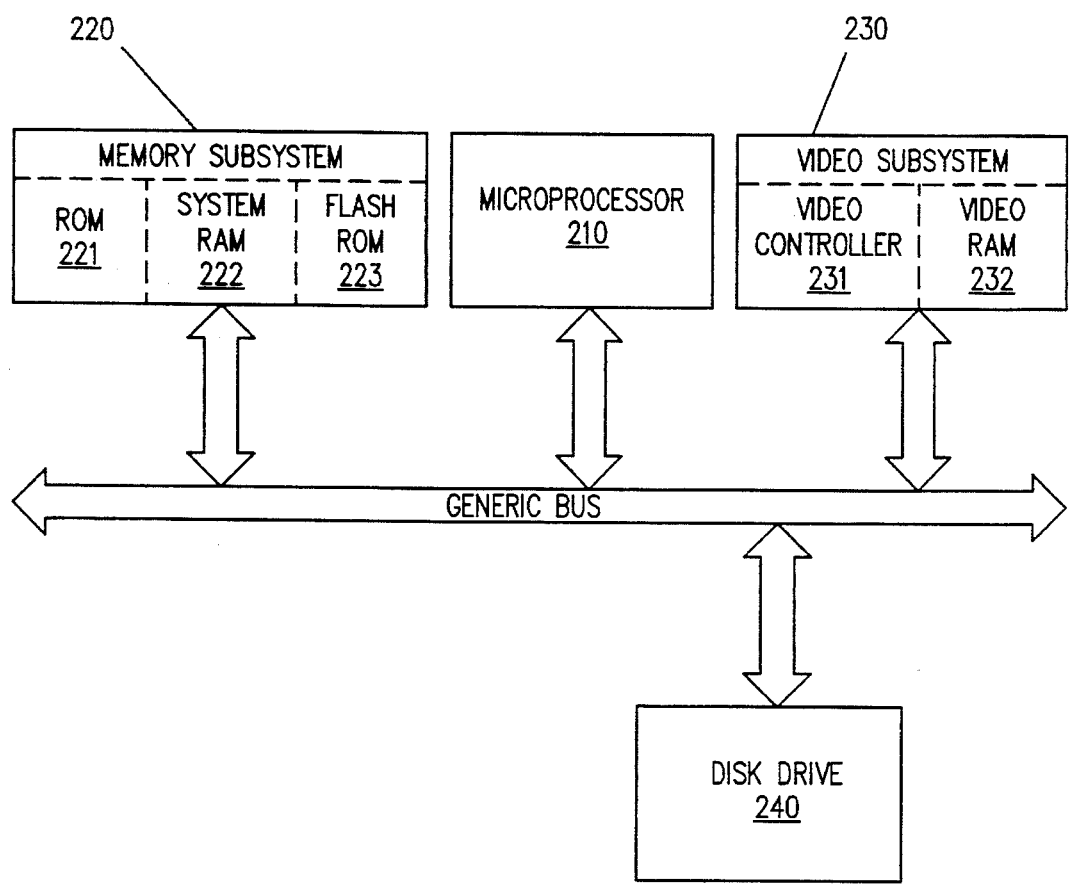
FIG. 2 illustrates a partial block diagram of a PC architecture; routines of the present invention.

Turning now to FIG. 2, illustrated is a partial block diagram of a PC architecture. The architecture comprises a microprocessor 210 coupled to a memory subsystem 220 and a video subsystem 230. The memory subsystem 220 comprises ROM 221, system RAM 222 and flash ROM 223, in which the boot loading routine of the present invention is stored. The video subsystem 230 comprises a video controller 231 and video RAM 232. Actually, video RAM 232 can be thought of as being in either the memory subsystem 220 or in the video subsystem 230. No matter how it is thought of, the video RAM 232 performs the same function. A disk drive 240 is coupled to the microprocessor 210 and the microprocessor 210 to send data to and receive data from a magnetic disk in a conventional manner.

Figure 3:
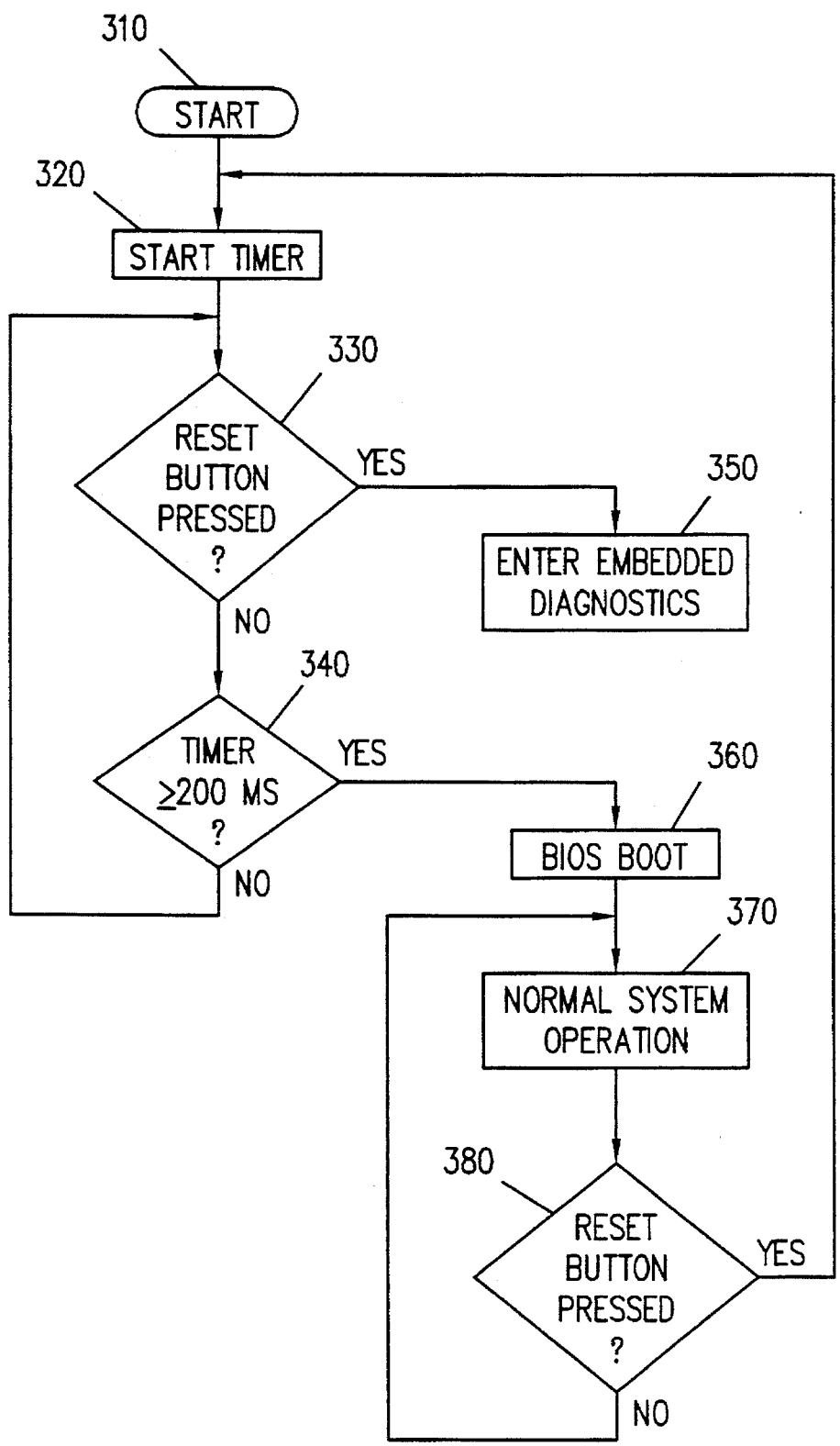
FIG. 3 illustrates a flow diagram of a procedure for entering the embedded diagnostic

Turning now to FIG. 3, illustrated is a flow diagram of a procedure for entering the embedded diagnostic routines of the present invention. Execution begins at "start" block 310 when the reset button 150 of FIG. 1 is pressed a first time. As soon as the button 150 is pressed, a timer is initialized to a value representing 200 milliseconds (block 320), within which the button 150 must again be pressed to enter diagnostics. Next, execution proceeds to decisional block 330 wherein a second button press is detected. If not, the timer is decremented (decisional block 340) and execution returns to the decisional block 330. If so, execution proceeds to block 350 and diagnostics are invoked.

If the timer counts a full 200 ms, execution proceeds to "BIOS boot" block 360, wherein the computer initializes and begins normal operation (block 370). If the reset button 150 is pressed during normal operation (decisional block 380), execution again proceeds to the block 320, offering another opportunity to enter diagnostics.

Figure 4:
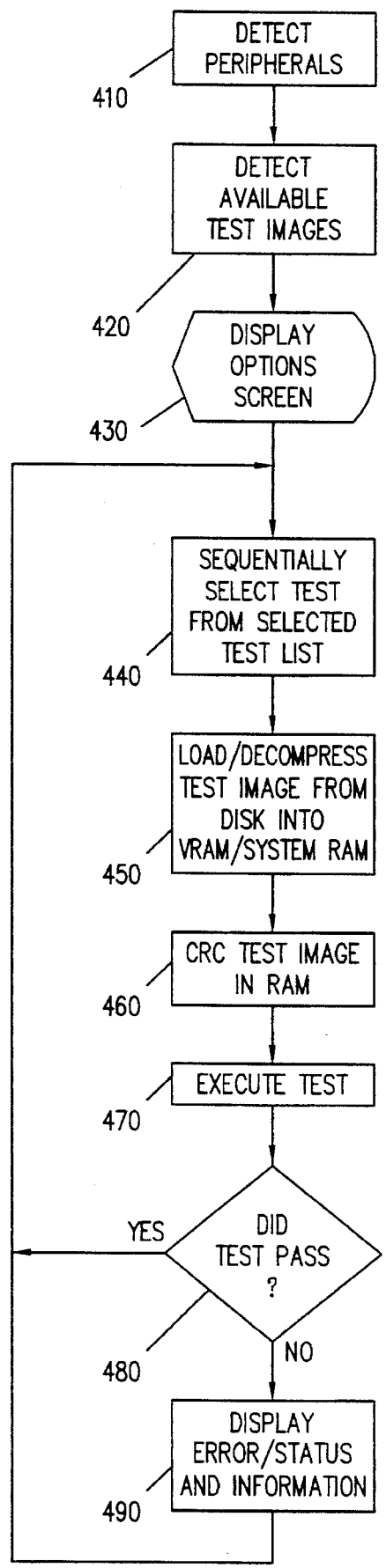
FIG. 4 illustrates a flow diagram of a procedure for executing the boot loader and loading and executing individual diagnostic routine images.

Turning now to FIG. 4, illustrated is a flow diagram of a procedure for executing the boot loader and loading and executing individual diagnostic routine images. FIG. 4 therefore represents the heart of the present invention.

Ser. No. (DC-00328) discloses a computer system diagnostic system and method by which the computer's core components are tested. These core components include the computer's microprocessor, the memory and video subsystems and the disk drives. Logically, core diagnostics should proceed through the system in a logical fashion, starting at the microprocessor and going outward, through timers, the programmable interrupt control, real time clock, the cache subsystem, the memory subsystem, disk controllers and drives and so on, until the entire core architecture has been tested. This ensures that no test is performed that itself depends upon the proper functioning of hardware that has not been tested. This is important with respect to the present invention, because the present invention begins execution under the assumption that the core computer components function properly.

The present invention requires the proper operation of the microprocessor, the memory and video subsystems and the disk drive on which the diagnostic routine images are stored, whether that disk drive be a floppy drive or a hard drive. However, it is equally important to note that, although the present invention requires these core components to function properly, the diagnostic system and method disclosed in Ser. No. (DC-00328) is not required, and that another diagnostic method could be employed (or none at all, if one wishes to live dangerously). Thus, it is highly desirable to insert a core diagnostics process between the processes described in FIGS. 3 and 4.

Turning now to FIG. 4, illustrated is a flow diagram of a procedure for executing the boot loader and loading individual diagnostic routines. FIG. 4 therefore represents the heart of the present invention. Execution begins at block 410, having come from the block 350 of FIG. 3 and is performed by the boot loading routine and the various diagnostic routine images retrieved from disk. In the block 410, the boot loading routine determines what peripherals are part of the computer system. This is done by scanning ports typically assigned to channel communications between the microprocessor and the peripherals. When the boot loading routine sends signals to these various ports, the peripherals respond. Sensing the presence of peripherals in a computer system is well known in the art.

Execution proceeds to decisional block 420, wherein the boot loading routine sends a request to the disk to determine what images are stored on the disk. In the preferred embodiment of the present invention, each separate image corresponds to a particular diagnostic routine. For instance, a diagnostic routine directed to testing the functionality of CD ROM is stored as a single image, loaded into video RAM at one time for execution therein. Each of the images is given a label. These labels for each of the routines are stored in a rudimentary directory on the disk. The boot loading routine is able to read this rudimentary directory to determine what diagnostic routine images are at its disposal.

Next, execution proceeds to block 430, wherein the boot loading routine has read the rudimentary image directory and generates, as a function of the peripherals detected and the contents of that directory, an options screen. The options screen is simply a menu of possible diagnostic routines a user can select. The options screen is presented to the user via the monitor 120 of FIG. 1.

In response to presentation of the options screen, the user selects a suite of tests to be performed in block 440. In one embodiment, the user selects/deselects particular tests presented in the options screen, pressing "Enter" or the like when through. The manner in which one selects these tests is conventional in the art and does not form a part of the present invention.

Next, execution proceeds to block 450, wherein the boot loading routine accesses, via a disk access routine within the boot loading routine, each of the selected diagnostic routine images in order. The boot loading routine detects the user's preferences as to which tests to perform. Starting at the top of the list of tests, the boot loading routine retrieves each diagnostic routine in order. Mechanically, this is done as follows. First, the disk access routine searches the rudimentary directory for the first of the selected diagnostic routine images. The directory contains an offset pointing to a location within a rudimentary file allocation table that, itself, points to a section of the disk containing the pertinent image. If the image is stored in noncontiguous sections of the disk, the rudimentary file allocation table will reflect this fact. It is important to note that the rudimentary directory and rudimentary file allocation table are preferably separate in location and different in structure from the directory and file allocation table created and accessed by the computer's normal disk operating system. The boot loading routine, in contrast to the operating system, creates a relatively simple data structure, suited to serve only the limited needs of the diagnostics procedure and mindful of the spatial constraints of the non-volatile RAM in which the boot loading routine is stored.

The disk access routine retrieves the pertinent diagnostic routine image from the disk and loads it into video RAM in a conventional manner, but without making any calls to normal operating system software pertaining to disk access or data moves within memory. However, because the correct functioning of the retrieved diagnostic routine is critical, it is not sufficient to simply vector execution from the boot loading routine to the retrieved routine at this point. Instead, in block 460, the boot loading routine verifies the contents of the video RAM to make sure that the data has been retrieved from disk intact. As indicated in the block 460, verification is performed by way of cyclical redundancy check ("CRC"). However, verification could be performed by way of checksum or parity or, in fact, by any one of the many conventional techniques for verifying data integrity. Techniques of verifying data integrity are well known in the art and incidental to the present invention.

Execution next proceeds to block 470, wherein it is assumed that the CRC verification test of the loaded image has proven successful and that, therefore, video RAM contains a valid copy of the selected retrieved diagnostic routine. In the block 470, diagnostics execution is vectored from the boot loading routine to the selected diagnostic routine stored in video RAM. In block 480, each test is performed.

Tests are performed on peripheral devices as the user has selected. If the user has chosen to test SCSI devices, for instance, the SCSI port and driver hardware are tested first, then the SCSI bus is tested. Finally, each device coupled to the SCSI bus is tested in turn. If the user has chosen to test the CD-ROM drive, then diagnostic routines pertaining to the CD-ROM controller are loaded from disk and executed. Following testing of the CD-ROM controller, routines pertaining to the drive itself are loaded from disk and run. When the test is completed, the results (error/status and other information) are displayed to the user to allow the user to make informed decisions regard the peripheral under test (block 490). Finally, execution returns to the block 440, wherein the next diagnostic routine to be executed is selected.

An important aspect of the present invention is that it employs video RAM to hold the retrieved diagnostic routines. In fact, in the preferred environment, the video RAM and the associated video controller are integrated into the PC architecture, rather than being a part of a video controller. The only way to initialize a video controller is to know in very great detail what type of controller it is, because there are no standards governing the operation of video controllers. There are only two ways to initialize a video controller. One is to manually initialize all control registers within the controller and the other is to actually make calls to BIOS routines that access the video controller.

Since, as mentioned before, it is desirable to avoid calls to BIOS hardware handling routines, manual initialization of video controller registers is the only acceptable way to maintain software independence. And, since there are no standards governing video controllers, video RAM and the controller must be integrated into the system to ensure that the boot loading routine knows what controller is present, eliminating a possibility of another type of controller being present.

From the above disclosure, it is apparent that the present invention provides a method of loading diagnostic routines in a computer system comprising the steps of (1) executing a boot loading routine stored in non-volatile memory within the computer system, the boot loading routine providing an environment in lieu of an operating system of the computer system within which to execute diagnostic routines, the boot loading routine including a disk access routine, (2) retrieving a diagnostic routine stored as an image on a disk into video RAM and (3) executing the retrieved diagnostic routine under control of the boot loading routine.

Although the present invention and its advantages have been described in detail, it should be understood that various changes, substitutions and alterations can be made herein without departing from the spirit and scope of the invention as defined by the appended claims.

What is claimed is:

1. A method of loading diagnostic routines in a computer system, comprising the steps of:

executing a boot loading routine stored in non-volatile memory within said computer system, said boot loading routine providing an environment in lieu of an operating system of said computer system within which to execute diagnostic routines, said boot loading routine including a disk access routine;

retrieving a diagnostic routine stored as an image on a disk into video random access memory (RAM) with said disk access routine; and executing said retrieved diagnostic routine under control of said boot loading routine.

2. The method as recited in claim 1 wherein said boot loading routine is functional in a pre-boot state and is independent of said operating system.

3. The method as recited in claim 1 further comprising the step of verifying an integrity of information in said retrieved diagnostic routine with said boot loading routine prior to performing said step of retrieving.

4. The method as recited in claim 1 further comprising the step of testing a functioning of a video subsystem of said computer system to determine whether said video subsystem is capable of operating in conjunction with said diagnostics programs prior to performing said step of retrieving.

5. The method as recited in claim 1 further comprising the step of determining a presence of a video monitor of said computer system prior to performing said step of retrieving.

6. The method as recited in claim 1 further comprising the step of retrieving a subsequent diagnostic routine image following execution of said retrieved diagnostic routine.

7. The method as recited in claim 1 wherein said computer system is a personal computer.

8. The method as recited in claim 1 wherein said non-volatile memory is electrically-erasable programmable read-only memory (EEPROM).

9. The method as recited in claim 1 wherein said disk is a hard disk.

10. A system for providing diagnostic routines for use in a computer, comprising:

a boot loading routine stored in non-volatile memory within said computer and including a disk access routine, said boot loading routine providing an environment in lieu of an operating system of said computer within which to execute diagnostic routines; and a diagnostic routine stored as an image on a disk, said disk access routine retrieving said diagnostic routine into video random access memory (RAM), said boot loading routine initiating execution of said retrieved diagnostic routine.

11. The method as recited in claim 10 wherein said boot loading routine is functional in a pre-boot state and is independent of said operating system.

12. The system as recited in claim 10 further comprising a microprocessor for executing said boot loading routine and said retrieved diagnostic routine.

13. The system as recited in claim 10 wherein said computer comprises a video subsystem having a monitor and said video RAM, said video subsystem allowing said computer to communicate with a user.

14. The system as recited in claim 10 wherein said disk contains a plurality of diagnostic routine images.

15. The system as recited in claim 10 wherein said boot loading routine includes a routine for verifying an integrity of information in said retrieved diagnostic routine.

16. The system as recited in claim 10 wherein said boot loading routine includes a routine for testing a functioning of a video subsystem of said computer to determine whether said video subsystem is capable of communicating with a user.

17. The system as recited in claim 10 wherein said boot loading routine retrieves a subsequent selected diagnostic routine image following execution of said retrieved diagnostic routine.

18. The system as recited in claim 10 wherein said computer is a personal computer.

19. The system as recited in claim 10 wherein said non-volatile memory is electrically-erasable programmable read-only memory (EEPROM).

20. The system as recited in claim 10 wherein said disk is a hard disk.

21. In a personal computer having a microprocessor, video random access memory (RAM), electrically-erasable programmable read-only memory (EEPROM), a disk controller coupled to a disk drive and a bus coupling said microprocessor to said RAM, said EEPROM and said disk controller, a method of performing diagnostic routines, comprising the steps of:

executing, with said microprocessor, a boot loading routine stored in said EEPROM, said boot loading routine providing an elemental operating system to support performance of diagnostic routines and containing a disk access routine; and retrieving, with said disk access routine, an initial portion of diagnostic routine code stored as an image on a disk in said disk drive, said initial portion loaded into said video RAM for execution by said microprocessor, said boot loading routine retrieving and loading a subsequent portion of diagnostic routine code into said video RAM following execution of said initial portion.

22. The personal computer as recited in claim 21 further comprising the step of verifying an integrity of information in said diagnostic routine code with said boot loading routine prior to performing said step of retrieving.

23. The personal computer as recited in claim 21 further comprising the step of testing a functioning of a video subsystem of said personal computer to determine whether said video subsystem is capable of operating in conjunction with said diagnostic routine code prior to performing said step of retrieving.

24. The personal computer as recited in claim 21 further comprising the step of determining a presence of a video monitor of said personal computer prior to performing said step of retrieving.

25. The personal computer as recited in claim 21 wherein said disk drive is a hard disk drive.

26. A computer memory subsystem in a computer system, comprising:

flash read-only memory (ROM) containing a boot loading routine, said boot loading routine providing an environment in lieu of an operating system of said computer system within which to execute diagnostic routines, said boot loading routine including a disk access routine;

a disk, coupled to said flash ROM, for storing a diagnostic routine as an image; and video random access memory (RAM) for storing a retrieved diagnostic routine, said boot loading routine storing said retrieved diagnostic routine in said video RAM and causing execution of said retrieved diagnostic routine.

27. The subsystem as recited in claim 26 wherein said computer system comprises a microprocessor for executing said boot loading routine and said retrieved diagnostic routine.

28. The subsystem as recited in claim 26 wherein said computer system comprises a video subsystem having a monitor and said video RAM, said video subsystem allowing said computer to communicate with a user.

29. The subsystem as recited in claim 26 wherein said disk contains a plurality of diagnostic routine images.

30. The subsystem as recited in claim 26 wherein said boot loading routine includes a routine for verifying an integrity of information in said retrieved diagnostic routine.

31. The subsystem as recited in claim 26 wherein said boot loading routine includes a routine for testing a functioning of a video subsystem of said computer system to determine whether said video subsystem is capable of communicating with a user.

32. The subsystem as recited in claim 26 wherein said boot loading routine retrieves a subsequent selected diagnostic routine image following execution of said retrieved diagnostic routine.

33. The subsystem as recited in claim 26 wherein said computer system is a personal computer.

34. The subsystem as recited in claim 26 wherein said disk is a hard disk.

35. A method of loading diagnostic programs in a personal computer, comprising the steps of:

verifying an integrity of information in a diagnostic routines stored as an image on a disk in a disk drive within said personal computer;

testing a functioning of a video subsystem of said personal computer to determine whether said video subsystem is capable of operating in conjunction with said diagnostic programs;

determining a presence of a video monitor of said personal computer;

retrieving a selected one of said diagnostic routine images from said disk;

storing said retrieved diagnostic routine in video random access memory (RAM) within said video subsystem; executing said retrieved diagnostic routine; and retrieving a subsequent selected diagnostic routine image following execution of said retrieved diagnostic routine, said boot loading routine performing said testing, determining, retrieving, storing and executing steps.

36. The method as recited in claim 35 wherein said non-volatile memory is electrically-erasable programmable read-only memory (EEPROM).

37. The method as recited in claim 35 wherein said disk is a hard disk.

38. The method as recited in claim 35 wherein said personal computer further comprises a keyboard allowing a user to interact with said diagnostic routine.

39. The method as recited in claim 35 wherein said method of loading diagnostics programs is initiated by pressing a reset button on said personal computer twice within a predetermined period of time.

40. A personal computer, comprising:

a microprocessor;

a video subsystem having a monitor and video random access memory (RAM), said video subsystem allowing said personal computer to communicate with a user;

a disk in a disk drive within said personal computer, said disk storing a plurality of diagnostic routine images; and non-volatile memory, said non-volatile memory containing a boot loading routine, said boot loading routine providing an elemental operating system to support performance of diagnostics on said personal computer and containing:

a routine for verifying an integrity of information in said plurality of diagnostic routine images; a routine for testing a functioning of said video subsystem to determine whether said video subsystem is capable of communicating with said user;

a routine for retrieving a selected one of said diagnostic routine images;

a routine for storing said retrieved diagnostic routine in said video RAM within said video subsystem; and a routine for executing said retrieved diagnostic routine, said retrieving routine retrieving a subsequent selected diagnostic routine image following execution of said retrieved diagnostic routine.

41. The personal computer as recited in claim 40 wherein said non-volatile memory is electrically-erasable programmable read-only memory (EEPROM).

42. The personal computer as recited in claim 40 wherein said disk drive is a hard disk drive.

43. The personal computer as recited in claim 40 wherein said personal computer further comprises a keyboard allowing a user to interact with said retrieved diagnostic routine.

44. The personal computer as recited in claim 40 wherein said boot loading routine is invoked by pressing a reset button on said personal computer twice within a predetermined period of time.

* * * * *